Patented Aug. 24, 1926.

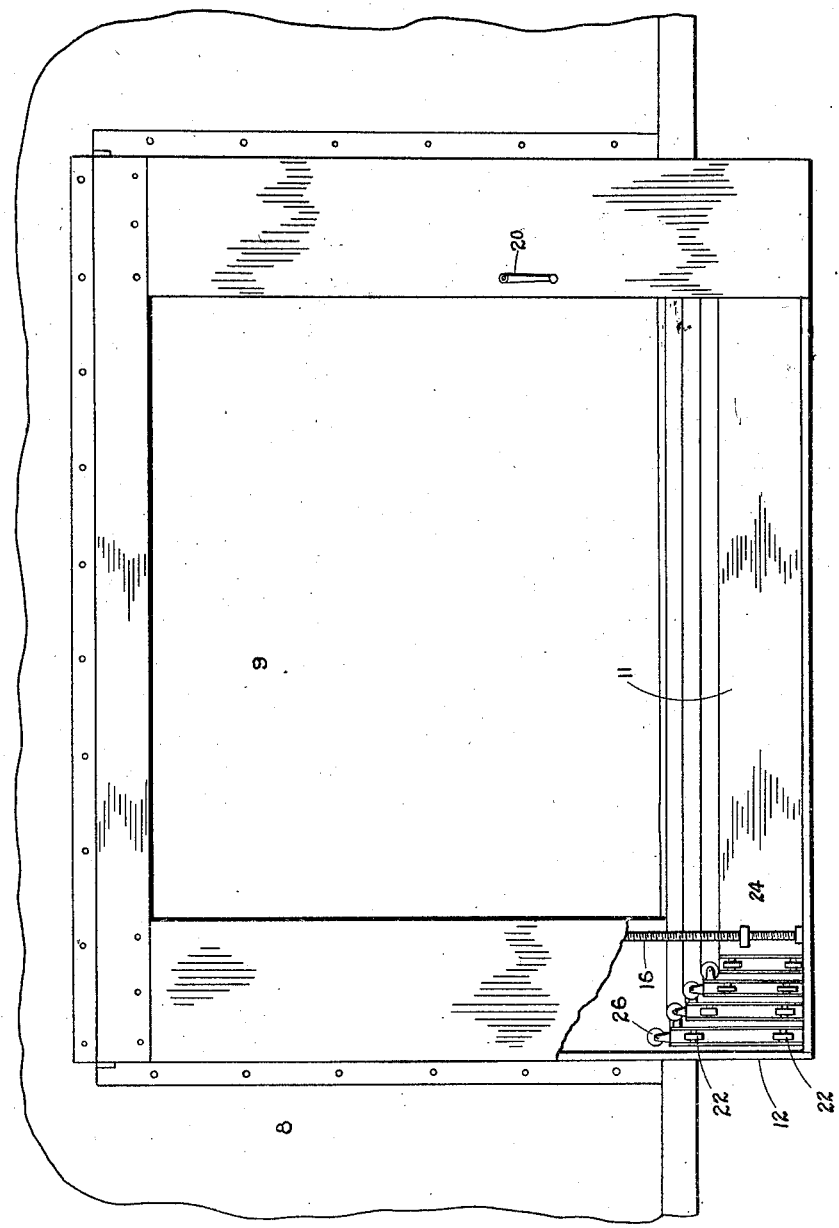

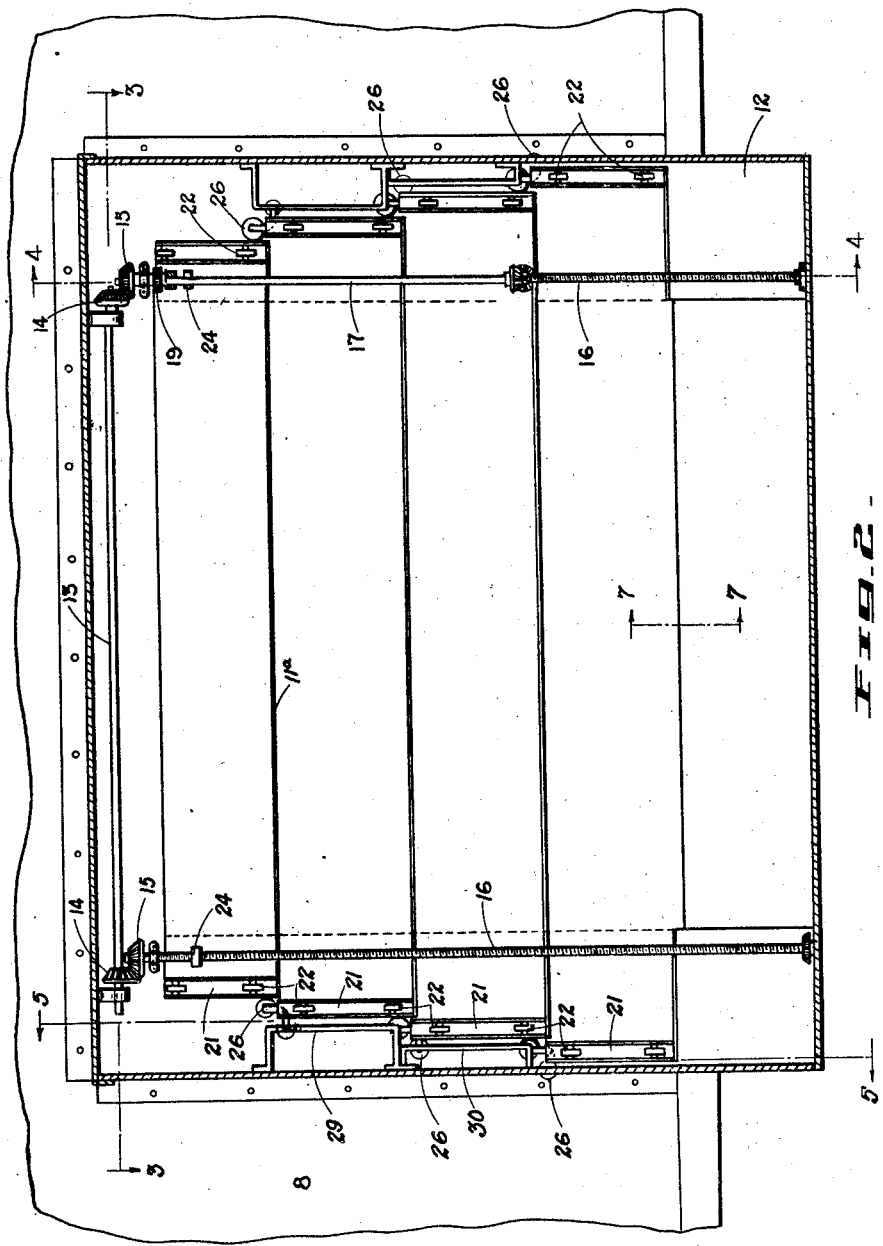

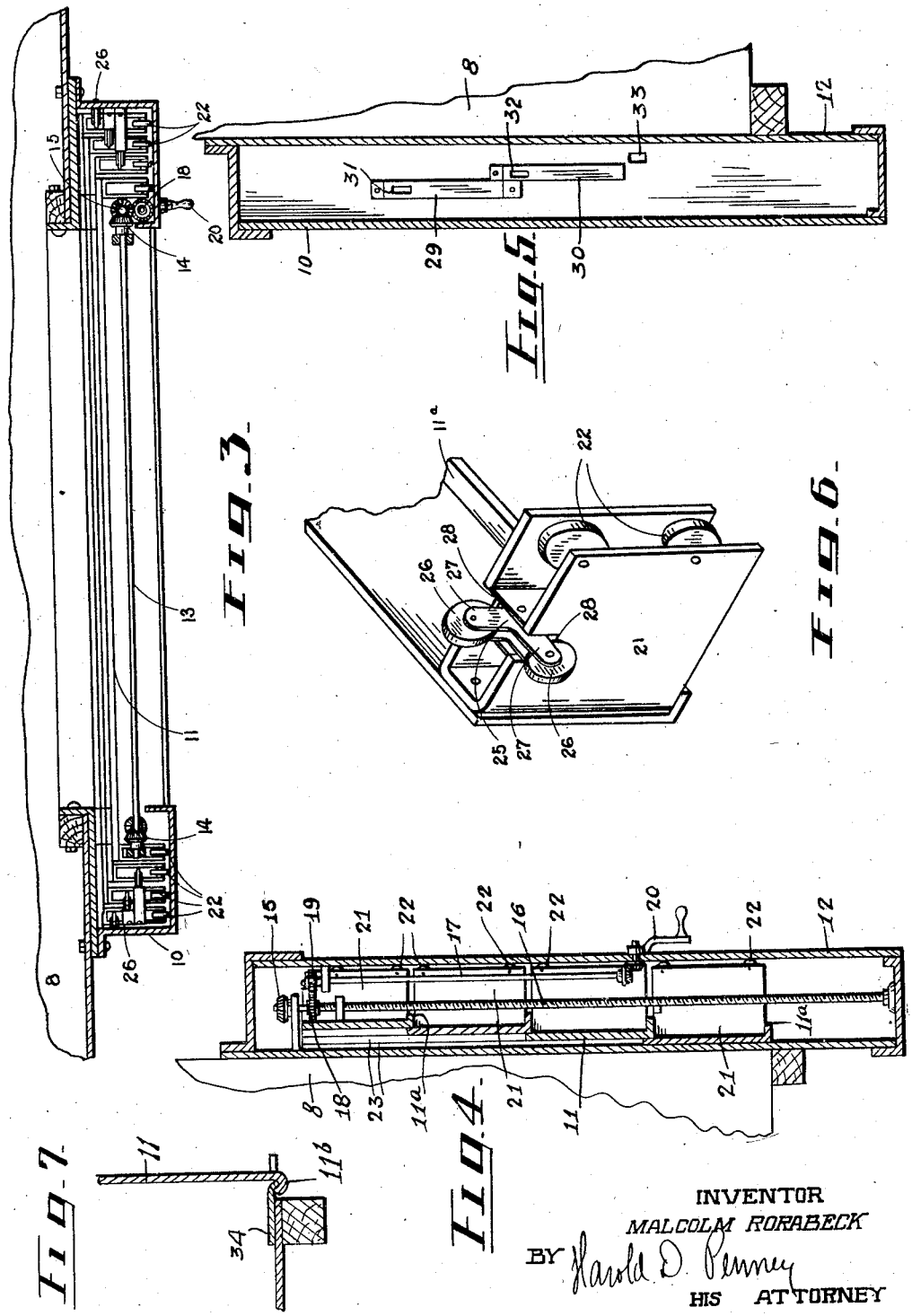

1,597,392

UNITED STATES PATENT OFFICE.

MALCOLM RORABECK, OF MILFORD, ONTARIO, CANADA.

GRAIN-CAR DOOR.

Application filed January 28, 1925. Serial No. 5,293.

My present invention relates to improvements in a grain car door appertaining particularly to an improved permanent frame about the door opening and a manually operated closure therefor.

An object is to provide a permanent, leak-proof closure comprising several sections allowing of the gradual closing of the door opening.

Another object is to provide a permanent frame for the door opening in which is mounted manually operated mechanisms for controlling the closure means.

Another object is the provision of a device of this character, gradually closing from the bottom upwards, will greatly facilitate the loading and unloading of grain.

A still further object is the provision of such a device wherein the number of parts are comparatively few, the construction relatively simple and being capable of manufacture at a reasonable cost is thus rendered commercially desirable.

To the accomplishment of these and related objects, my invention resides in the construction, combination and arrangement of parts as shall be hereinafter more fully described, illustrated in the accompanying drawings and pointed out in the claims hereunto appended.

In the drawings forming a part of the disclosure,

Fig. 1 is an elevation of the door opening of a grain car with my improved device applied, Fig. 2 is a similar elevation with part of the door frame removed and showing the door in closed position, Fig. 3 is a horizontal section on line 3—3 of Fig. 2.

Figs. 4 and 5 are vertical sections on lines 4—4 and 5—5 respectively of Fig. 2.

Fig. 6 is a detail of one of the locking rollers carried by the ends of the sections, shown in perspective, and Fig. 7 is a sectional detail taken on line 7—7 of Fig. 2.

A general consideration of my grain car door reveals an improved and permanent casing surrounding the door opening housing a pair of upright threaded shafts manually operated by an exposed hand crank. One of these shafts is on each side of the opening and a shaft with bevel gears, across the top, connects them. The door closure is composed of a plurality of co-operating sections each in the form of a broad strip extending the width of the door and though stepped laterally to allow of compact arrangement of the several sections when in opened position, they are interconnected by angle locks that hold them to operate unitedly with the top section until each reaches its fully closed position. So the door treated as a closure as a unit or as composed of a number of individual sections is controlled solely by the movement of the topmost section from which collars project that are threaded on the aforesaid upright shafts and which it will thus be seen is moved vertically by the rotation of the hereinbefore mentioned crank.

When the door is opened, the closure sections lie successively in a box below the door opening formed by a continuation of the door frame. The opening is closed by the actuation of the crank which is transmitted to the upright shafts and causes the top section to move upwards, which in doing so carries all the other sections with it till one by one as they reach their allotted places they are freed from connection with the top piece and losing engagement with it are held in position by the section next above which with the remaining sections continues the upward movement.

The opening of the door brought about by lowering the sections is accomplished by the reverse rotation of the hand crank.

Referring particularly to the drawings, wherein like characters designate like parts throughout the several views, the numeral 8 denotes the grain car in general having a door opening 9 cut in the side thereof. This opening has a frame or casing 10 about the perimeter, projecting laterally from the car, that houses the operating mechanism and the sectional door 11 when same is in opened or inoperative position, a box 12 being provided therefor in the bottom of said casing below the car floor level.

A horizontal shaft 13 with a bevel gear 14 on each end, crosses the top of the door opening. Bevels 15 on the tops of a pair of threaded vertical shafts 16, one of which is located on each side of the door opening, mesh with the bevels 14, while an additional upright shaft 17 paralleling the shafts 16 is disposed adjacent one of said vertical shafts 16 and extends from midway of the door opening to approximately the level of the top of the shafts 16. Gears 18 and 19 keyed, near the top, to adjacent shafts 16 and 17 respectively mesh so that the actuation of a hand crank 20, projecting outwardly through the casing 10, geared to said upright 17 produces the like rotation of both the threaded shafts 16.

The door closure 11 inoperatively housed within the box bottom 12 of the door frame casing is composed of a plurality of sections, the embodiment illustrated comprising four such parts, successively offset and consecutively reduced so that when elevated to close the opening they are not only stepped laterally but arranged pyramidally.

Though the sections are all of different lengths they are also of different heights for a purpose to be later defined and from both ends of each section, channels or U-ends 21 of varying depths, to compensate for the lateral stepping of the sections, project and carry a pair of rollers 22 that run on the inside of the wall of casing 10.

Supported thus from the front, the sections of the door, reinforced by an outwardly directed flange 11ᵃ across the bottom of each, are backed by the loaded grain and prevented from falling inwardly by the panel strips 23 that abut the rear of each section at both ends.

From the top section, an eyelet 24 projects laterally at each end and is interiorly threaded to receive the upright shaft 16 the rotation of which results in the vertical movement of the said section.

The coupling or interconnection of the sections, about to be described, is accomplished by the utilization of roller carrying bell cranks 25 mounted in the channels 21 on the ends of the sections except the top section and horizontally pivoted in a plane at right angles to the axis of guide rollers 22 (see Fig. 6). The crank carried rollers 26 are pivoted in arms 27 of the bell crank that extend from the pivot at right angles to each other. The said bell crank member is mounted near the top of the channel 21 in which slots 28 are provided, and is rotatable through an angle of 90°. The dimensions of the bell crank member 25 and its arms 27 are such that the vertical roller 26 mounted in said arms 27 lies flush with that side of the supporting channel that is remote from the projecting roller 26, all of which roller extends exteriorly of the said channel.

A pair of brackets 29 and 30 project inwardly from both sides of the casing 10 by which three steps are formed.

These brackets correspond in height and are disposed laterally to register with the door sections rising level with them and project inwardly varying distances to compensate for the diminution in length of the cooperating door sections. Thus it will be seen that the staggered lateral position and reduced length of the sections is counteracted and an abutment provided for the ends of the three bottom door sections (the walls supplying the abutments for the bottom most section). Slots 31 and 32 are cut in the brackets 29 and 30 respectively, near the top and a similar slot 33 is provided in the casing wall 10, said latter slot 33 bearing the same relation to slot 32 as 32 does to slot 31, the purpose of which will be hereinafter described.

When the door 11 is opened and all the sections 14 are arranged in place in the box 12 the top section is in the front and being shorter and the top side thereof being lower than the adjoining section the projecting U-ends thereof are enclosed by the U-ends of the next door section which is similarly embraced by the third and fourth sections successively.

The several sections are also interlocked by the overlying bell cranks; the topmost section being of least height has one arm of the pivoted U-carried bell crank on each end of the second section pressing down on the top of the U-ends thereof, the other arms of said bell cranks being held vertically by lateral contact with the U-ends of the third section, whose roller carrying bell cranks in turn overlie the U-ends of the second section being retained by the rising walls of the U-ends of the fourth member, the U-carried bell cranks of which overlie in the same way the ends of the third section with the vertically carried roller running on the wall of casing 10.

Thus it will be apparent that if crank 20 is actuated to rotate the threaded shafts 16 as the top section will travel upwardly it will carry the other three sections. The outwardly directed bottom flange 11ᵃ of the bottom section is reversed however as at 11ᵇ throughout the width of the door opening and on reaching the bottom thereof, said inturned flange engages with the projecting lip 34, forming a tight joint therewith simultaneously with which the vertical bell crank rollers of this section register with the openings 33 and seat therein on the pivoting of the bell cranks, thus urged by the adjoining section the U-ends of which now serve to retain the bell cranks of the lower section in their assumed position. In a similar way, the U-carried bell cranks of the next two sections find seats in the openings 32 and 31 respectively, in which they are held by the U-ends of the section next above.

So with the top section the other sections are elevated to their allotted places and there locked by the adjoining section immediately above.

The opening of the door is produced by the reverse rotation of the hand crank on which the top section drops to the level of the section next below thereby releasing this section which on descending in turn releases the sections third from the top and so on until the door forming sections are again arranged and housed with the casing box 12.

From the foregoing description taken in connection with the accompanying drawings, it will be manifest that a grain car door is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new and desire to secure by Letters Patent is:

1. In a door closure for grain cars, a plurality of sections and an automatic means, capable of assuming two positions with relation to the section supporting the same, for interlocking said sections each with the one above and for retaining said sections in position when elevated to a predetermined height respectively.

2. In a door closure for grain cars, a plurality of sections and interlocking means, carried by each section except the first, for connecting each section with the one immediately above and adapted for actuation by such section immediately above for maintaining the elevated position of the section by which it is carried.

3. In a door closure for grain cars, a plurality of sections, means for interlocking said sections and means for elevating said sections, said interlocking means serving to connect each section with the one above, for purposes of elevation, and to be actuated by said section above, on reaching a predetermined elevation, to maintain such elevation.

4. In a grain car, a door closure comprising a plurality of vertically movable sections, means for interlocking said sections with the topmost one and means for elevating said topmost section, said interlocking means being released thereby and acting as retaining means for the several sections in elevated position.

5. In a grain car, a door closure comprising a plurality of vertically movable sections, means for interlocking said sections with the topmost one and means for elevating said topmost section, the interlocking of said sections being released successively from the bottommost section upwards, said interlocking means thereafter acting as a means for retaining the several sections in elevated position.

6. In a grain car, a door opening, a frame therefor and a closure comprising a plurality of laterally stepped vertically movable sections, an automatic means for interlocking said sections, when in one position, with the topmost section and for retaining said sections at a predetermined elevation, in a second position, and manually operated means for elevating said sections.

7. A door closure comprising a plurality of individual sections normally interlocked and controlled by the topmost section, means for elevating the topmost section and with it the remaining sections and means for allowing of the releasing of the said interlocking means for each successive section when the same has been elevated to the predetermined position.

8. A door closure comprising a plurality of individual sections, means for interconnecting said sections for purposes of elevation and, with co-operation by the section immediately above, for holding each in elevated position, means for elevating the topmost section and with it the remaining sections and means for allowing of the releasing of the said interlocking means for each successive section when the same has been elevated to the predetermined position.

9. A door closure comprising a plurality of individual sections, means carried by each section, the topmost only excepted, for normally interlocking said sections until their respective and predetermined positions are reached and adapted thereon for actuation by the section moving to position immediately above to lock the same in such elevated position, means for elevating the topmost section and with it the remaining sections and means for allowing of the releasing of the said interlocking means for each successive section when the same has been elevated to the predetermined position.

10. A door closure comprising a plurality of individual sections; means carried by said sections, the topmost only excepted, for normally interlocking said sections until their respective and predetermined positions are reached and adapted thereon for actuation by the section moving to position immediately above the supporting section to lock the same in such elevated position and maintain such locking; means for elevating the topmost section and with it the remaining sections and means for allowing of the releasing of the said interlocking means for each successive section when the same has been elevated to the predetermined position.

11. A door closure comprising a plurality of individual sections, means carried by each section, the topmost only excepted, for normally interlocking said sections until their respective and predetermined positions are reached and adapted on the movement of the adjoining section to effect the locking and releasing of the supporting section, means for elevating the topmost section and with it the remaining sections and means for allowing of the releasing of the said interlocking means for each successive section when the same has been elevated to the predetermined position.

12. In a grain car, a door opening, a frame therefor, and a closure comprising a plurality of laterally stepped sections; a pair of co-operating threaded shafts disposed vertically, one on either side of the door opening; projecting collars carried by the topmost door section interiorly threaded to receive said shafts; means for interlocking the remaining sections with said topmost section; manually operated means for rotating said shafts to elevate said topmost section and the sections locked thereto; and means for allowing of the releasing of said remaining sections from said topmost section when a predetermined elevation is reached.

13. In a grain car, a door opening, a frame therefor, and a closure comprising a plurality of laterally stepped sections; a pair of cooperating threaded shafts disposed vertically, one on either side of the door opening; projecting collars carried by the topmost door section interiorly threaded to receive said shafts; means for interlocking the remaining sections with said topmost section; manually operated means for rotating said shafts to elevate said topmost section and the sections locked thereto; and means for allowing of the releasing of said interlocking means to release the remaining sections from said topmost section when a predetermined elevation is reached when said interlocking means act to lock each of said sections in elevated position by co-operation of the adjacent sections.

14. In a grain car, a door opening, a frame therefor, and a closure comprising a plurality of laterally stepped sections, an outwardly turned reinforcing flange across the bottom of each of said sections, a reversed portion on the flange of the bottom of said sections for the width of the door opening adapted to contact and form a tight joint with a lip projecting from the car floor, a pair of co-operating threaded shafts disposed vertically, one on either side of the door opening; projecting collars carried by the topmost door section interiorly threaded to receive said shafts; means for interlocking the remaining sections with said topmost section; manually operated means for rotating said shafts to elevate said topmost section and the sections locked thereto; means for allowing of the releasing of said remaining sections from said topmost section when a predetermined elevation is reached whereupon said interlocking means is made to act as a locking element in co-operation with adjacent sections to lock each of said sections in elevated position.

15. A device of the character described comprising a pair of manually operated co-operating shafts disposed vertically, one on either side of the door-opening, a closure comprising a plurality of sections successively reduced in height and length and stepped laterally from each other; channels of various depths to compensate for the lateral stepping of said sections on the ends thereof; bell cranks pivotally mounted in said channels adapted to project laterally therefrom to engage the sides of the door opening in one position and overlie the end channel of an adjacent section in another position; projecting collars from the topmost of said sections interiorly threaded to receive said shafts and manually operated means for rotating said shafts.

16. A device of the character described comprising a pair of manually operated co-operating shafts disposed vertically, one on either side of the door opening, a closure comprising a plurality of sections successively reduced in height and length and stepped laterally from each other; channels of various depths to compensate for the lateral stepping of said sections on the ends thereof; stepped lateral extensions on the side faces of said door opening to compensate for the reduction in length of the successive sections; bell cranks pivotally mounted in said channels in stepped relation and adapted to project laterally therefrom to engage the sides of the door opening or the said lateral extensions therefrom, on one position, and overlie the end channel of an adjacent section in another position; projecting collars from the topmost of said sections interiorly threaded to receive said shafts and manually operated means for rotating said shafts.

17. A device of the character described comprising a pair of manually operated co-operating shafts disposed vertically, one on either side of the door opening; a closure comprising a plurality of sections successively reduced in height and length and stepped laterally from each other, channels of various depths to compensate for the lateral stepping of said sections on the ends thereof; means for stopping the elevation of individual sections at a predetermined level; bell cranks pivotally mounted in said channels adapted to project laterally therefrom to lock the section in elevated position and overlie the end channel of an adjacent section in another position; projecting collars from the topmost of said sections interiorly threaded to receive said shafts and manually operated means for rotating said shafts.

18. A device of the character described comprising a pair of manually operated cooperating shafts disposed vertically, one on either side of the door opening; a closure comprising a plurality of sections successively reduced in height and length and stepped laterally from each other; channels of various depths to compensate for the lateral stepping of said sections on the ends thereof; means for stopping the elevation of individual sections at a predetermined level; the impeding element for the lowermost section comprising an inturned anchoring lip and the impeding element for the upper sections comprising means associated with the side wall of the door opening; bell cranks pivotally mounted in said channels adapted to project laterally therefrom to lock the section in elevated position and overlie the end channel of an adjacent section in another position; projecting collars from the topmost of said section interiorly threaded to receive said shafts and normally operated means for rotating said shafts.

19. In a grain car, a door opening, a frame therefor, stepped lateral extensions on the side faces of said door opening, spaced stepped cavities in the side walls of said frame and extensions; a pair of manually operated co-operating shafts disposed vertically, one on either side of the door opening; a closure comprising a plurality of sections successively reduced in height and length and stepped laterally from each other; channels of various depths to compensate for the lateral stepping of said sections on the ends thereof; bell cranks pivotally mounted in said channels in stepped relation and adapted to register with and project into the said cavities on the elevation of the section moving to position immediately above the supporting section and to overlie the end channel of said adjoining section when the same has descended to a lower level than the said supporting section; projecting collars from the topmost of said sections interiorly threaded to receive said shaft and manually operated means for rotating said shaft.

20. In a grain car, a door opening, a frame therefor forming a chamber about the sides and bottom of said opening open only in the direction of said door opening; stepped lateral extensions on the side faces of said frame; spaced stepped cavities in the side wall of said frame and extensions; a pair of manually operated co-operating shafts disposed vertically, one on either side of the door opening; a closure comprising a plurality of sections successively reduced in height and length and stepped laterally from each other, channels of various depths to compensate for the lateral stepping of said sections on the ends thereof; rollers in said channels adapted to run on the inside of said frame, bell cranks pivotally mounted in said channels in stepped relation and adapted to register with and project into the said cavities on the elevation of the adjoining section moving to position immediately above the supporting section and to overlie the end channel of said adjoining section when the same has descended to a lower level than the said supporting section; projecting collars from the topmost of said sections interiorly threaded to receive said shaft and operated means for rotating said shaft.

21. In a grain car, a door opening, a frame therefor forming a chamber about the sides and bottom of said opening open only in the direction of said door opening; stepped lateral extensions on the side faces of said frame; spaced stepped cavities in the side walls of said frame and extensions; a pair of manually operated co-operating shafts disposed vertically, one on either side of the door opening; a closure comprising a plurality of sections successively reduced in height and length and stepped laterally from each other; channels of various depths to compensate for the lateral stepping of said sections on the ends thereof; rollers in said channels adapted to run on the inside of said frame; bell cranks pivotally mounted in said channels in stepped relation and adapted to register with said cavities on the full elevation of the supporting section, to be projected thereinto on the continuing elevation of the section moving to position immediately above the said supporting section and to be there retained by the bearing thereon of the wall of the channel on said adjoining section until the same has descended to a lower level than the said supporting section and then to be released from said cavity and by the action of the weight of the supporting section to be moved into position to overlie the said end channel of the said adjoining section; projecting collars from the topmost of said sections interiorly threaded to receive said shaft and means for rotating said shaft, substantially as described.

In testimony whereof I hereunto affix my signature.

MALCOLM RORABECK.